United States Patent [19]

Takahashi et al.

[11] Patent Number: 5,512,941
[45] Date of Patent: Apr. 30, 1996

[54] IMAGE SENSING APPARATUS

[75] Inventors: Koji Takahashi; Isao Harigaya, both of Kanagawa, Japan

[73] Assignee: Canon Kabushiki Kaisha, Tokyo, Japan

[21] Appl. No.: 265,503

[22] Filed: Jun. 24, 1994

Related U.S. Application Data

[63] Continuation of Ser. No. 664,323, Mar. 4, 1991, abandoned.

[51] Int. Cl.⁶ ........................................ H04N 7/18
[52] U.S. Cl. .............. 348/81; 340/636; 348/239; 348/334; 358/906
[58] Field of Search ............... 340/636; 348/81, 348/239, 334; 358/906

[56] References Cited

U.S. PATENT DOCUMENTS

| | | | |
|---|---|---|---|
| 3,435,136 | 3/1969 | Bachmann | 358/224 |
| 4,239,356 | 12/1980 | Freudenschuss | 358/227 |
| 4,485,398 | 11/1984 | Chapin | 358/99 |
| 4,743,831 | 5/1988 | Young | 340/636 |
| 4,855,820 | 8/1989 | Barbour | 358/99 |
| 4,894,728 | 1/1990 | Goodman | 360/6 |
| 4,959,735 | 9/1990 | Kawai | 358/906 |
| 5,033,818 | 7/1991 | Barr | 350/174 |

OTHER PUBLICATIONS

*Canon E80/E808 8mm Video Camera & Recorder* Instruction Manual © 1989.

*Primary Examiner*—Howard W. Britton
*Attorney, Agent, or Firm*—Robin, Blecker, Daley & Driscoll

[57] ABSTRACT

An image sensing apparatus includes an image sensing circuit for outputting a video signal representative of a subject image, a water-depth sensor for measuring water depths, an indication signal generating circuit for generating a signal for indication of the value of a water depth measured by the depth-water sensor, a combining circuit for combining an output of the image sensing circuit with an output of the indication signal generating circuit, an image displaying circuit for displaying an image represented by an output of the combining circuit, and a recording circuit for recording the video signal representative of the subject image on a recording medium.

12 Claims, 5 Drawing Sheets

IMAGE SENSING APPARATUS

This is a continuation of prior application U.S. Ser. No. 07/664,323, filed Mar. 4, 1991, now abandoned.

BACKGROUND OF THE INVENTION

1. Field of the Invention

The present invention relates to image sensing apparatus such as still cameras, video cameras and television cameras and, more particularly, to an image sensing apparatus suitable for underwater photography.

2. Description of the Related Art

In recent years, as the number of persons who enjoy scuba diving has rapidly increased, the number of persons who perform underwater photography has also increased. As is known, conventional image sensing apparatus for underwater photography merely utilizes waterproofed combinations of cameras and accessory parts (for example, a video light unit). In practice, a generally-used type of camera-integrated VTR (video tape recorder) is accommodated in a waterproof case. The waterproof case consists of a housing which can be separated into two housing elements so that the camera-integrated VTR can be freely put into and taken out of the waterproof case. Both housing elements can be coupled to each other by a watertight structure such as an 0-shaped ring.

In scuba diving, water-depth information is one of the most important kinds safety information for persons who go down to relatively great depths in water. In general, waterproof cameras are designed and manufactured so that they can withstand water pressures not exceeding the standard values specified in their written specifications, and there is no guarantee that they can withstand water pressures exceeding such standard values. For this reason, a user must always be careful to use a waterproof camera within a pressure range not exceeding the withstand (maximum) pressure of the waterproof camera, and water-depth information is similarly important for the waterproof camera.

Currently, wrist-watch types of water-depth meters are commercially available, and if the user utilizes such a water-depth meter, he can confirm water depths at any time. However, if the user is to confirm a water depth during underwater photography, he must take his eye away from a viewfinder and view the indication of the water-depth meter. If he is absorbed in the photography, he may forget to confirm water depths. Otherwise, he may be hindered from concentrating on the photography due to anxiety about water depths.

During scuba diving, it is necessary to regularly confirm the remaining amount of air in a compressed-air cylinder. However, while the user is performing underwater photography, he is apt to be absorbed in the photography to such an extent that he forgets to confirm the remaining amount of air in the compressed-air cylinder. This is extremely dangerous.

In addition, since it is impossible to replace a battery or a magnetic tape used as a recording medium, the user needs to go up to the surface of water.

SUMMARY OF THE INVENTION

It is, therefore, an object of the present invention to provide an image sensing apparatus which can eliminate the above-described inconveniences to implement safe and easy underwater photography.

To achieve the above object, according to one preferred form of the present invention, there is provided an image sensing apparatus which comprises image sensing means for outputting a video signal representative of a subject image, a water-depth sensor for measuring water depths, indication signal generating means for generating a signal for indication of the value of a water depth measured by the depth-water sensor, combining means for combining an output of the image sensing means and an output of the indication signal generating means, image displaying means for displaying an image represented by an output of the combining means, and recording means for recording the video signal representative of the subject image on a recording medium. The image sensing apparatus further comprises warning generating means for generating a predetermined warning signal if the measured water depth exceeds a predetermined allowable value.

With the above-described arrangement, it is possible for a user to confirm water depths without taking an eye away from a viewfinder. Accordingly, it is possible to prevent with a high degree of reliability the user from forgetting to confirm water depths even when the user is absorbed in photography in water, whereby the user can perform underwater photography safely and easily.

According to another form of the present invention, there is provided an image sensing apparatus which is arranged to display a predetermined warning in a viewfinder if at least one of the remaining amount of air in a compressed-air cylinder, the remaining amount of recording time of a recording medium and the remaining amount of battery power decreases to a predetermined value.

With this arrangement, a user can be informed of the timing of replacement of a compressed-air cylinder, a recording medium or a battery without taking an eye away from the viewfinder. Accordingly, it is possible to prevent the user from forgetting to confirm the remaining amount of air in the compressed-air cylinder even when the user is absorbed in photography in water. It is also possible to prevent the user from missing a photographic opportunity. In consequence, the user can perform underwater photography safely and easily.

According to another form of the present invention, there is provided an image sensing apparatus which comprises primary image sensing means for imaging a subject, subsidiary image sensing means for imaging a pressure indication of a compressed-air cylinder, combining/selecting means for combining an output of the primary image sensing means and an output of the subsidiary image sensing means or selecting either one of these outputs, and monitor means for displaying an image represented by an output of the combining/selecting means.

In the above-described arrangement, the remaining amount of air in the compressed-air cylinder is displayed on a monitor screen at all times, at regular intervals or at a specified time. It follows, therefore, that the pressure of the air remaining in the compressed-air cylinder is confirmed at all times, at regular intervals or at a specified time, whereby it is possible to perform underwater photography safely and easily.

According to another form of the present invention, there is provided an image sensing apparatus arranged to display the remaining amount of air in a compressed-air cylinder in the interior of a viewfinder.

With this arrangement, it is possible for a user to confirm the remaining amount of air in a compressed-air cylinder without taking an eye away from a viewfinder. Accordingly, it is possible to prevent with a high degree of reliability the user from forgetting to confirm the pressure of the air remaining in the compressed-air cylinder even when the user is absorbed in photography in water, whereby the user can perform underwater photography safely and easily.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings.

Figure 1:
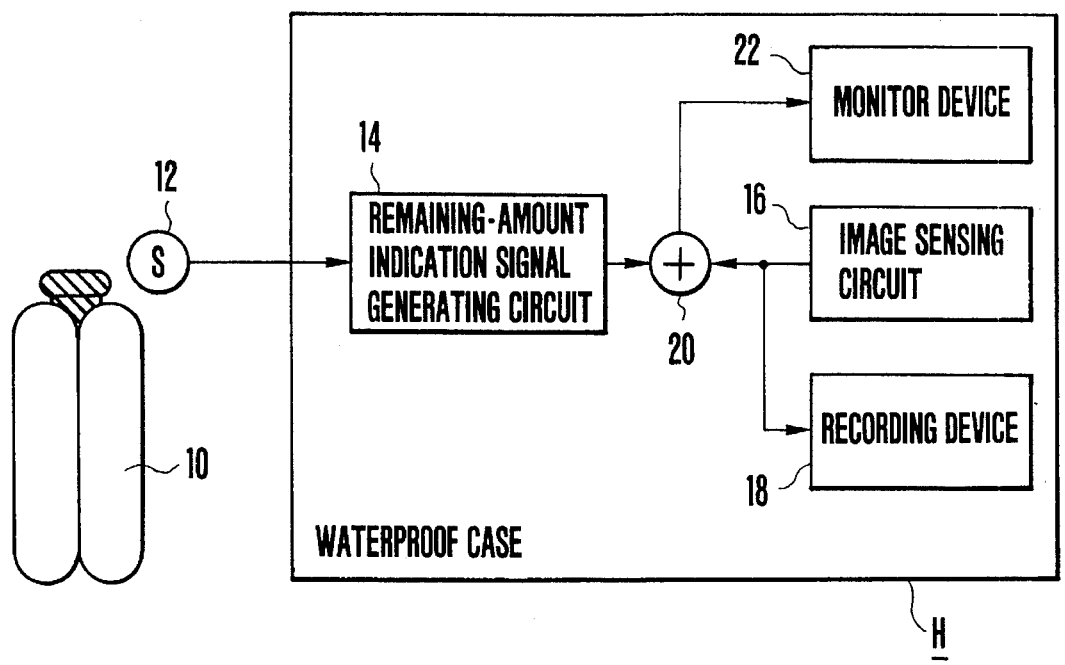
FIG. 1 is a schematic block diagram showing the arrangement of a first embodiment of the present invention.

FIG. 1 is a schematic block diagram showing a first embodiment of the present invention. In FIG. 1, reference numeral 10 denotes a compressed-air cylinder, and reference numeral 12 denotes a pressure sensor of the type which is commonly provided for measuring the pressure of the air remaining in the compressed-air cylinder 10. In the first embodiment shown in FIG. 1, a remaining-amount indication signal generating circuit 14 generates a remaining-amount indication signal (an image signal visually representative of the amount of the air remaining in the compressed-air cylinder 10) from the remaining-amount output of the pressure sensor 12. An image sensing circuit 16 generates a video signal representative of an imaged subject, and includes a CCD and a signal processing circuit for subjecting the output of the CCD to predetermined signal processing. A recording device (or so-called VTR) 18 records the video signal outputted from the image sensing circuit 16. A combining circuit 20 combines the video signal outputted from the image sensing circuit 16 and the remaining-amount indication signal outputted from the remaining-amount indication signal generating circuit 14. A monitor device 22 serves as, for example, an electronic viewfinder, and displays an image represented by the video signal outputted from the combining circuit 22. The remaining-amount indication signal generating circuit 14, the image sensing circuit 16, the recording device 18, the combining circuit 20 and the monitor device 22 are accommodated in a waterproof housing H.

Figure 2:
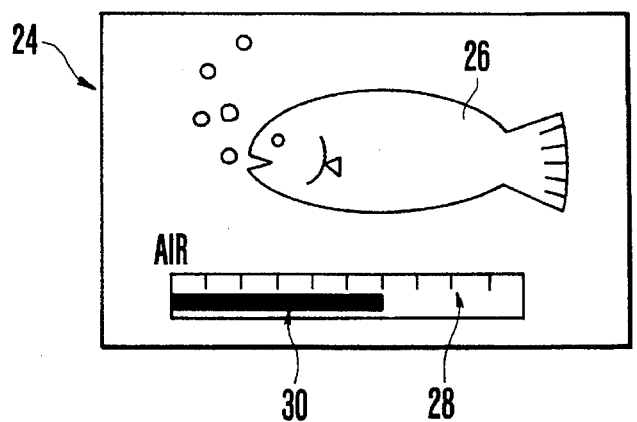
FIG. 2 is a schematic view showing an example of a display according to the first embodiment.

FIG. 2 shows an example of a display provided by the monitor device 22. In FIG. 2, reference numeral 24 denotes a display screen, reference numeral 26 denotes a fish which is a subject, and reference numeral 28 denotes a remaining-amount indication represented by the aforesaid remaining-amount indication signal. In the remaining-amount indication 28, a bar 30 indicative of the remaining amount is displayed along a scale which is graduated from the full state to the empty state of the compressed-air cylinder 10.

In the above-described first embodiment, the remaining-amount indication is provided inside of the display frame of a viewfinder screen. However, such an indication may, of course, be provided outside of the display frame. In this case, the output of the remaining-amount indication signal generating circuit 14 may be applied directly to the monitor device 22. In either case, if a photographer can only view the remaining-amount indication while looking through the viewfinder, the objects of the present invention are achieved.

The scale of the remaining-amount indication need not necessarily be graduated up to the full state of the compressed-air cylinder 10, and a scale graduated up to a predetermined remaining amount may be displayed. Otherwise, a scale may be displayed which is graduated for a remaining amount corresponding to a time period which is not greater than two times the time period required for a user to rise to the surface of water.

As will be readily understood from the foregoing description, according to the first embodiment, since it is possible to confirm the remaining amount of the air of a compressed-air cylinder within a viewfinder at all times, a photographer can avoid the danger of forgetting to confirm the remaining amount of air when he is absorbed in photography in water. Accordingly, it is possible to perform underwater photography safely and easily.

Figure 3:
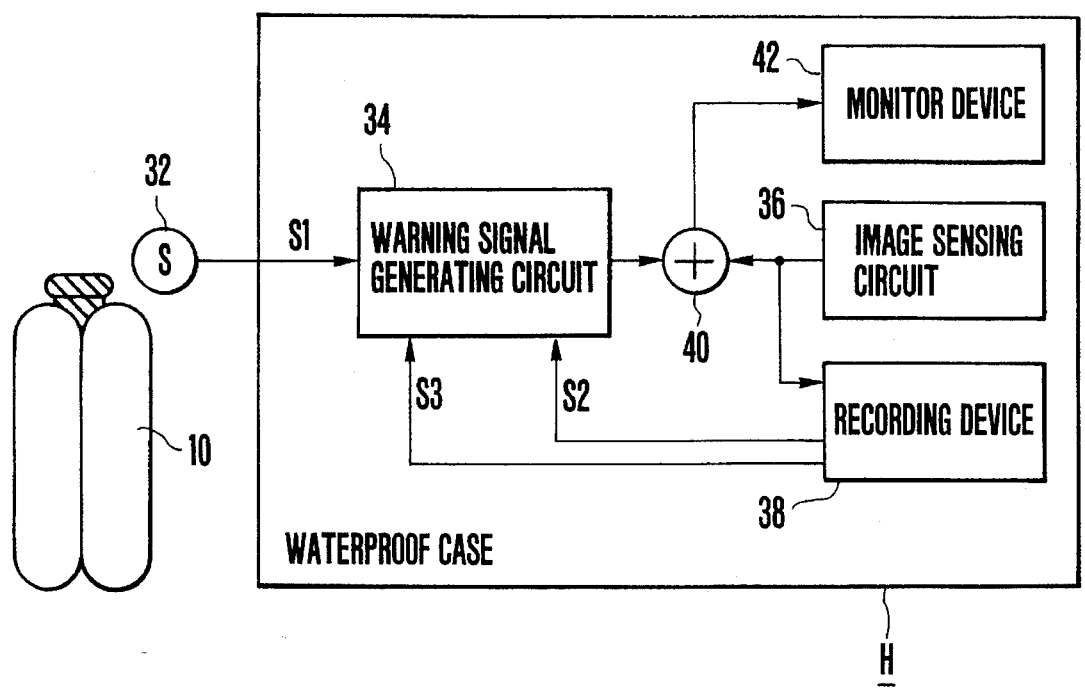
FIG. 3 is a schematic block diagram showing the arrangement of a second embodiment of the present invention.

FIG. 3 is a schematic block diagram showing a second embodiment of the present invention. In FIG. 3, reference numeral 10 denotes a compressed-air cylinder, and reference numeral 32 denotes a pressure sensor of the type which is commonly provided for measuring the pressure of the air remaining in the compressed-air cylinder 10. In the second embodiment shown in FIG. 3, a warning signal generating circuit 34 generates a warning video signal indicative of the pressure of the air remaining in the compressed-air cylinder 10, the remaining amount of recording time of a magnetic tape, and the remaining amount of battery power on the basis of a remaining-amount output S1 from the pressure sensor 32, a remaining-amount-of-magnetic-tape signal S2 and a remaining-amount-of-battery signal S3 both of which are supplied from a recording device 38 as will be described later. An image sensing circuit 36 generates a video signal representative of an imaged subject, and a recording device (or so-called VTR) 38 records the video signal outputted from the image sensing circuit 36. A combining circuit 40 combines the video signal outputted from the image sensing circuit 36 and the warning video signal outputted from the warning signal generating circuit 34. A monitor device 42 serves as an electronic viewfinder, and displays an image represented by the video signal outputted from the combining circuit 40. The warning signal generating circuit 34, the image sensing circuit 36, the recording device 38, the combining circuit 40 and the monitor device 42 are accommodated in the waterproof housing H.

Figure 4:
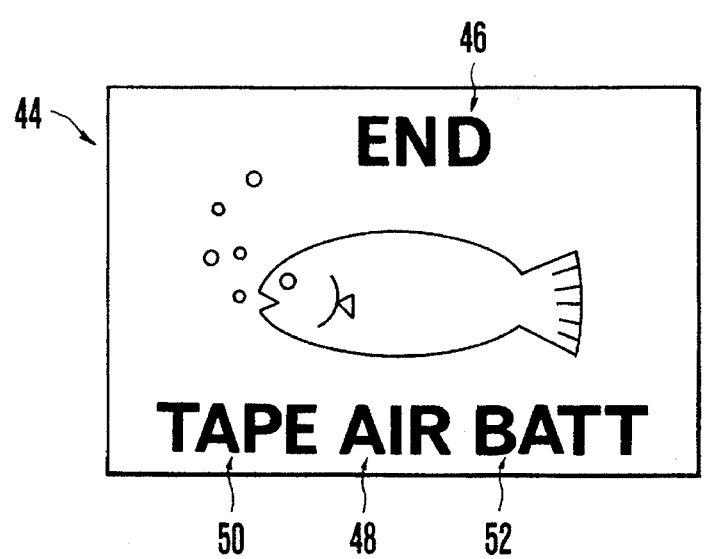
FIG. 4 is a schematic view showing an example of a display according to the second embodiment.

FIG. 4 shows an example of a display provided by the monitor device 42. In FIG. 4, reference numeral 44 denotes a display screen, and if any one of the pressure of the air remaining in the compressed-air cylinder 10, the remaining amount of the recording time of the magnetic tape, and the remaining amount of battery power decreases to a predetermined amount, an "END" mark 46 is displayed in a blinking manner in the top portion of the display screen 44, while a corresponding information content is displayed in a stationary or blinking manner in the lower portion. In the case of a decrease in the pressure of the air remaining in the compressed-air cylinder 10, an "AIR" mark 48 is displayed in a stationary or blinking manner; in the case of a decrease in the remaining amount of the recording time of the magnetic tape, a "TAPE" mark 50 is displayed in a stationary or blinking manner; and in the case of a decrease in the remaining amount of battery power, a "BATT" mark 52 is displayed in a stationary or blinking manner. If a plurality of factors are present, all corresponding marks are displayed in a stationary or blinking manner.

Figure 5:
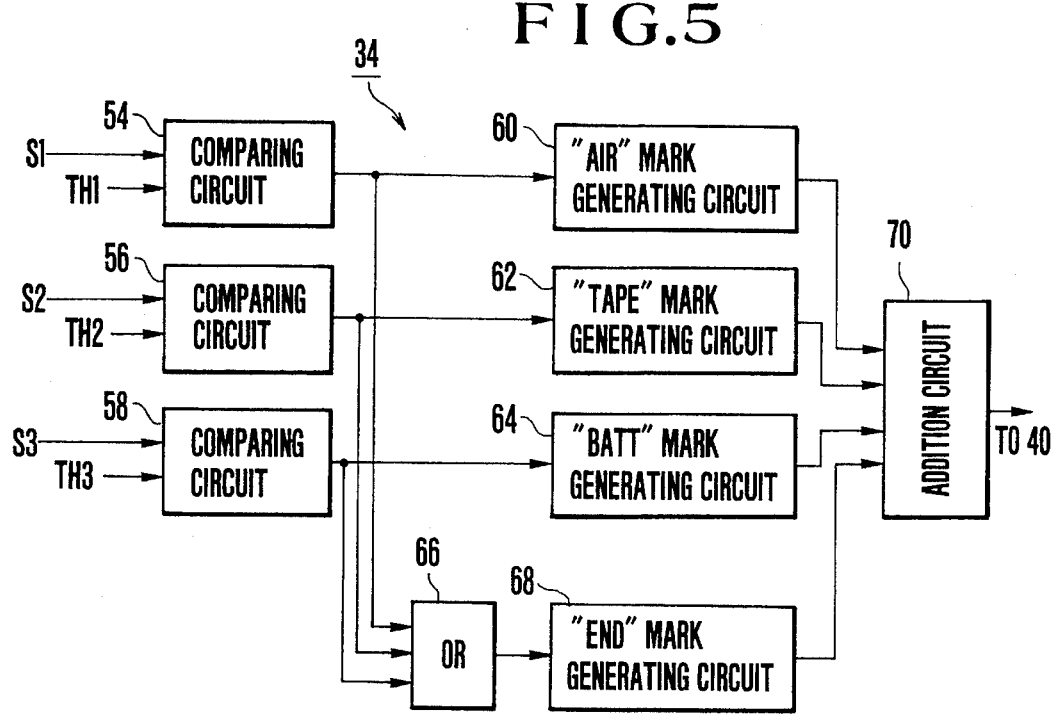
FIG. 5 is a circuit diagram showing an example of the construction of the warning signal generating circuit 34 shown in FIG. 3.

FIG. 5 shows an example of the circuit construction of the warning signal generating circuit 34. The remaining-amount signal S1 from the pressure sensor 32, the remaining-amount-of-magnetic-tape signal S2 and the remaining-amount-of-battery signal S3, both of which are supplied from the recording device 38, are respectively compared with reference values TH1, TH2 and TH3 in comparing circuits 54, 56 and 58. The comparison results are respectively supplied to an "AIR" mark generating circuit 60, a "TAPE" mark generating circuit 62, and a "BATT" mark generating circuit 64. The "AIR" mark generating circuit 60, the "TAPE" mark generating circuit 62 and the "BATT" mark generating circuit 64 generate video signals representative of the "AIR" mark 48, the "TAPE" mark 50 and the "BATT" mark 52, respectively, as shown in FIG. 4.

The outputs of the comparing circuits 54, 56 and 58 are also applied to an OR circuit 66, and the output of the OR circuit 66 (the logical sum of the comparison results of the respective comparing circuits 54, 56 and 58) is applied to an "END" mark generating circuit 68. The "END" mark generating circuit 68 is a circuit for generating a video signal corresponding to the "END" mark 46 shown in FIG. 4.

In the above-described circuit construction, if the pressure of the air remaining in the compressed-air cylinder 10 reaches to the reference value TH1, the "AIR" mark generating circuit 60 generates a video signal representative of the "AIR" mark 48; if the remaining amount of the recording time of the magnetic tape reaches to the reference value TH2, the "TAPE" mark generating circuit 62 generates a video signal representative of the "TAPE" mark 50; and if the remaining amount of battery power reaches to the reference value TH3, the "BATT" mark generating circuit 64 generates a video signal representative of the "BATT" mark 52. The "END" mark generating circuit 68 generates a video signal representative of the "END" mark 46 if any one of the pressure of the air remaining in the compressed-air cylinder 10, the remaining amount of the recording time of the magnetic tape and the remaining amount of battery power reaches to the reference value TH1, TH2 or TH3. The outputs of the respective mark generating circuits 60, 62, 64 and 68 are added together by an addition circuit 70, and supplied to the combining circuit 40.

In the above-described second embodiment, each of the remaining-amount indications is provided inside of the display frame of a viewfinder screen. However, such indications may, of course, be provided outside of the display frame. In this case, the output of the warning signal generating circuit 34 may be applied directly to the monitor device 42. In either case, if a photographer can only view the remaining-amount indications while looking through the viewfinder, the objects of the present invention are achieved.

As will be readily understood from the foregoing description, according to the second embodiment, since it is possible to confirm the pressure of the air remaining in a compressed-air cylinder within the viewfinder at all times, a photographer can avoid the danger of forgetting to confirm the remaining amount of air when he is absorbed in photography in water. In addition, since the photographer can be informed of the remaining amount of the recording time of a recording medium and the timing of replacement of a battery, the user can be prevented from missing a photographic opportunity.

Figure 6:
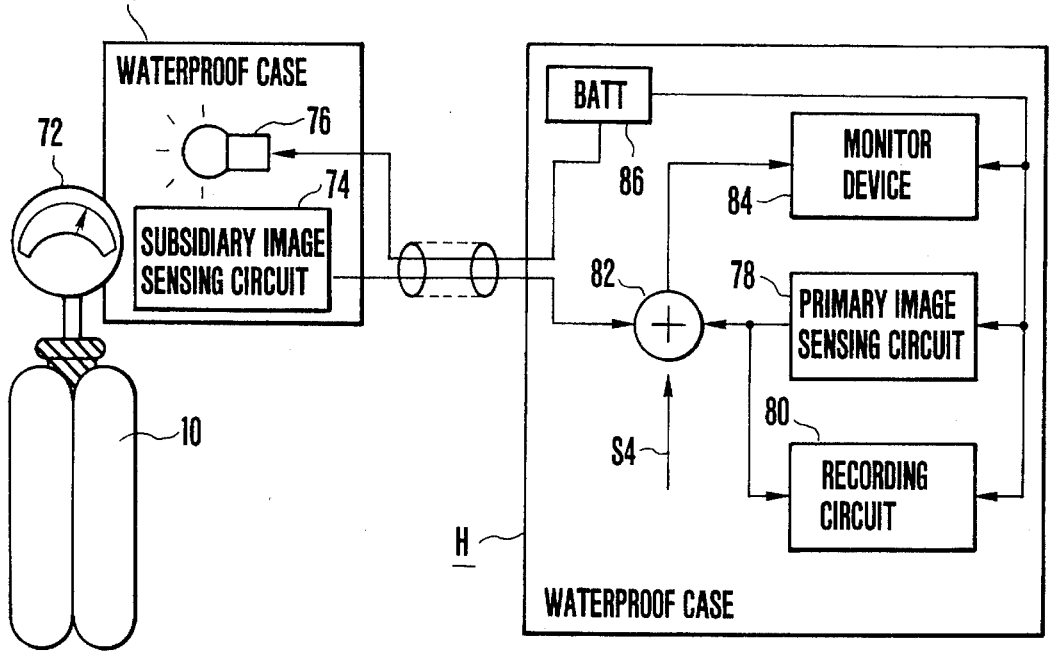
FIG. 6 is a schematic block diagram showing the arrangement of a third embodiment of the present invention.

FIG. 6 is a schematic block diagram showing a third embodiment of the present invention. In FIG. 6, reference numeral 10 denotes a compressed-air cylinder, and reference numeral 72 denotes a pressure meter which indicates the pressure of the air remaining in the compressed-air cylinder 10. A subsidiary image sensing circuit 74 images the value indicated on the pressure meter 72. A lamp 76 illuminates the pressure meter 72 for the purpose of providing the sufficient illumination required for imaging. The lamp 76 and the subsidiary image sensing circuit 74 are accommodated in a waterproof case C, and are fixed in the vicinity of the pressure meter 72 so that the value indicated on the pressure meter 72 can be imaged.

A primary image sensing circuit 78 generates a video signal representative of an imaged subject, and a recording device (or so-called VTR) 80 records the video signal outputted from the primary image sensing circuit 78. A combining circuit 82 responds to a control signal S4 to superimpose a video signal supplied from the subsidiary image sensing circuit 74 on the video signal outputted from the primary image sensing circuit 78 or to selectively output a specified one of these video signals. A monitor device 84 serves as a viewfinder, and displays an image represented by the video signal outputted from the combining circuit 82. The primary image sensing circuit 78, the recording device 80, the combining circuit 82 and the monitor device 84 are accommodated in the waterproof housing H. A battery 86 is provided for supplying electrical power to the primary image sensing circuit 78, the recording device 80 and the monitor device 84 as well as the illumination lamp 76.

Figure 7:
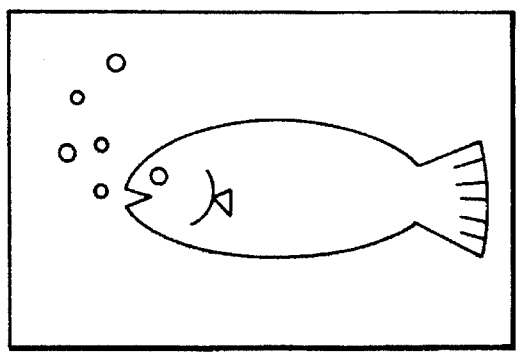
FIGS. 7, 8 9 are schematic views showing different examples of displays according to the third embodiment.
Figure 8:
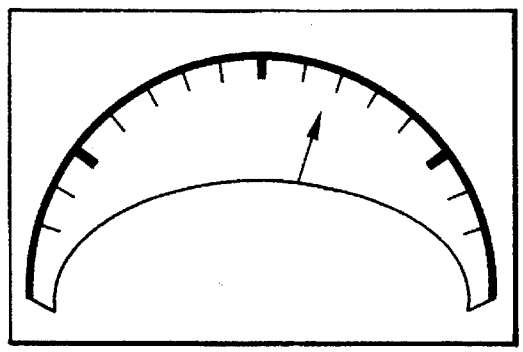
Figure 9:
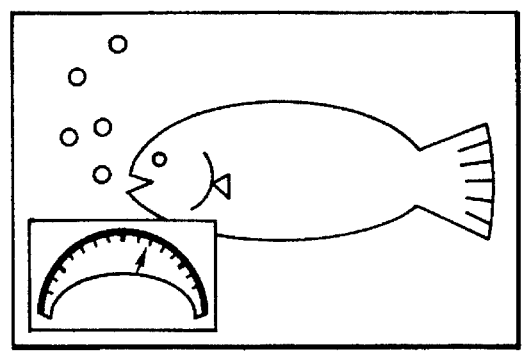

FIGS. 7, 8 and 9 show different examples of displays provided by the monitor device 84. FIG. 7 shows a case where the combining circuit 82 supplies to the monitor device 84 only the video signal outputted from the primary image sensing circuit 78. FIG. 8 shows a case where the combining circuit 82 supplies to the monitor device 84 only the video signal outputted from the subsidiary image sensing circuit 74. FIG. 9 shows a case where the combining circuit 82 superimposes the video signal supplied from the subsidiary image sensing circuit 74 on the video signal supplied from the primary image sensing circuit 78 and supplies the result to the monitor device 84.

The displays of FIGS. 7 and 8 may be switched manually or automatically by using a timer. Also, the displays of FIGS. 7, 8 and 9 may be selectively displayed or switched in accordance with the operating state of the recording device 80.

As will be readily understood from the foregoing description, according to the third embodiment, since it is possible to confirm the remaining amount of the air of a compressed-air cylinder on a monitor screen at all times, a photographer can avoid the danger of forgetting to confirm the remaining amount of air when he is absorbed in photography in water.

Accordingly, it is possible to perform underwater photography safely and easily. In addition, the third embodiment may be applied to a compressed-air cylinder of any type which is commercially available.

Figure 10:
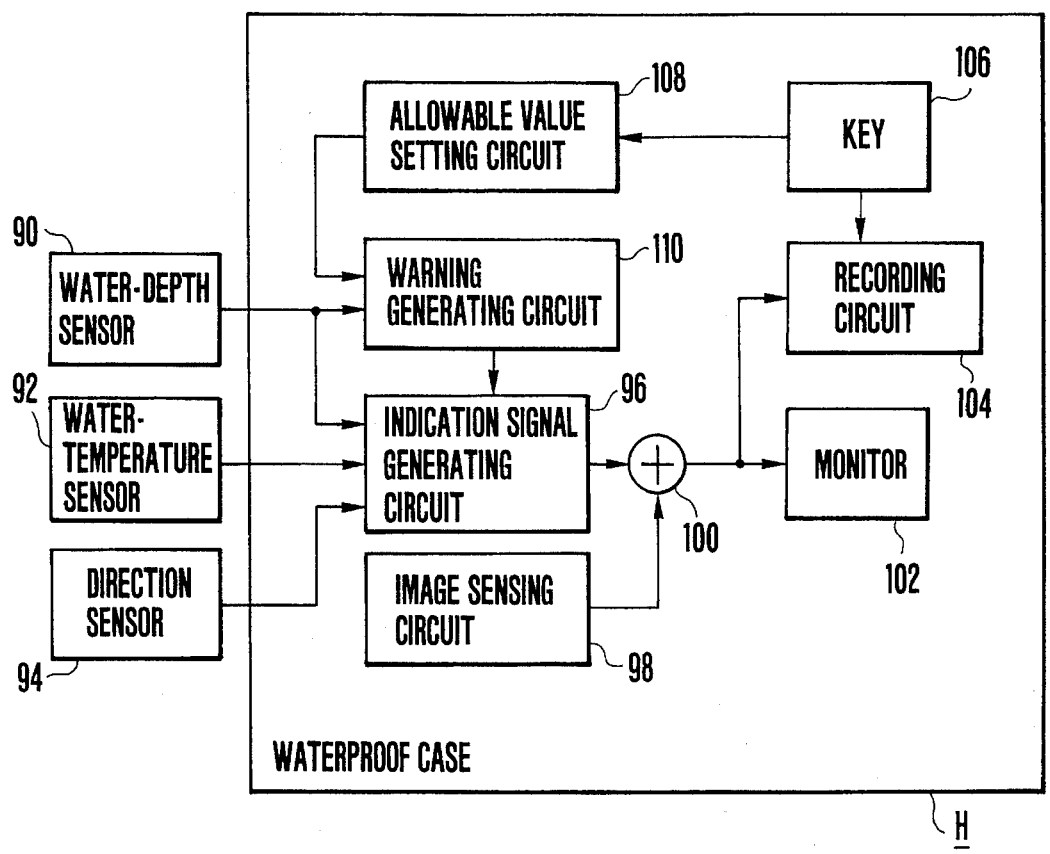
FIG. 10 is a schematic block diagram showing the arrangement of a fourth embodiment of the present invention.

FIG. 10 is a schematic block diagram showing the construction of a fourth embodiment of the present invention. A water-depth sensor 90 outputs an electrical signal corresponding to a water depth. A water-temperature sensor 92 outputs an electrical signal corresponding to a water temperature. A direction sensor 94 outputs an electrical signal corresponding to a direction. An indication signal generating circuit 96 receives the outputs from the respective sensors 90, 92 and 94 and generates a video signal for indication of each kind of measured value. An image sensing circuit 98 outputs a video signal representative of a subject. A combining circuit 100 combines the output of the image sensing circuit 98 and the output of the indication signal generating circuit 96. A monitor 102 provides a display of an image represented by the signal outputted from the combining circuit 100. The monitor 102 functions as an electronic viewfinder. A recording circuit 104 records the video signal outputted from the combining circuit 100 on a recording medium such as a magnetic tape. A key 106 is operated to input various kinds of instructions. An allowable level setting circuit 108 sets a warning generation level for a warning generating circuit 110 in accordance with the allowable value of water depth which is set through the key 106. The warning generating circuit 110 always compares the set allowable value with the output of the water-depth sensor 90, and when a water depth exceeding the set allowable value is reached, a predetermined warning is generated by means of a sound, light, vibration or an monitor image or a combination thereof.

The above-described circuits 96, 98, 100, 102, 104, 106, 108 and 110 are accommodated in the waterproof housing H.

Figure 11:
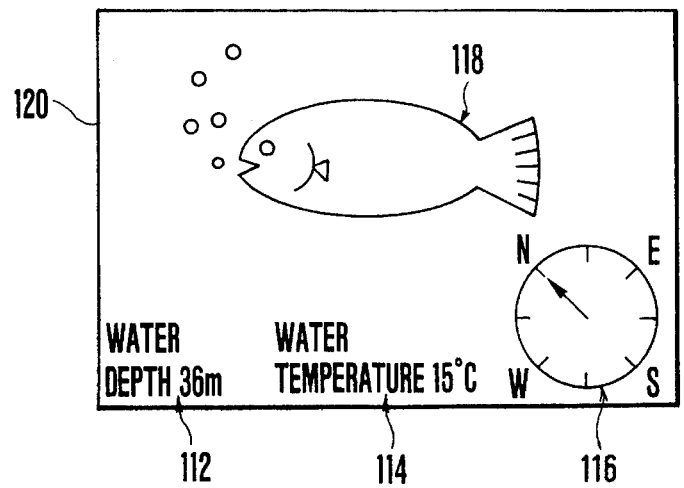
FIG. 11 is a schematic view showing an example of a display on the monitor 102 shown in FIG. 10.

FIG. 11 shows an example of a display provided on the monitor 102. Reference numeral 120 denotes the display screen of the monitor 102, reference numeral 112 denotes an indication of the water depth measured by the water-depth sensor 90, reference numeral 114 denotes an indication of the water temperature measured by the water-temperature sensor 92, and reference numeral 116 denotes an indication of the direction measured by the direction sensor 94. Such a direction indication may be provided by imaging a compass needle itself and superimposing it on the monitor screen. Reference numeral 118 denotes a fish 118 which is a subject.

The way of using the fourth embodiment and the operation thereof will be described in brief. Before diving, a user operates the key 106 to input the allowable water depth of the waterproof housing H or a water depth at which it is desired to generate a warning. In response to this input, the allowable value setting circuit 108 sets the allowable value of the water depth in the warning generating circuit 110. The water-depth sensor 90, the water-temperature sensor 92 and the direction sensor 94 measure a water depth, a water temperature and a direction, respectively, and output electrical signals corresponding to their respective measured values. The outputs of the respective sensors 90, 92 and 94 are applied to the indication signal generating circuit 96, which outputs a video signal for displaying each of the measured values on the monitor 102, as shown by the reference numerals 112, 114 and 116 in FIG. 11.

The image sensing circuit 98 outputs a video signal representative of a subject. The combining circuit 100 combines this subject video signal and the output of the indication signal generating circuit 96 to apply the composed signal to each of the monitor 102 and the recording circuit 104. As shown in FIG. 11, the monitor 102 displays the image of the subject and images indicative of the measured values supplied from the respective sensors 90, 92 and 94. The recording circuit 104 records the video signal outputted from the combining circuit 100 on a magnetic tape (not shown) in response to the operation of the key 106.

The output of the water-depth sensor 90 is also applied to the warning generating circuit 110, which compares the set allowable value with the current water depth. If it is determined that the current water depth has exceeded the allowable value, the warning generating circuit 110 generates a warning by using a sound, light, vibration or the like and outputs a control signal to the indication signal generating circuit 96, thereby causing the water-depth indication 112 to blink. To generate such a warning, all or part of a sound, light and the blinking of an image indication may be employed, or a pressure stimulus may be applied to a user.

Although the above description has been made with reference to camera-integrated VTRs, each of the aforesaid embodiments is, of course, similarly applicable to electronic still cameras. In the case of an electronic still camera, the recording circuit 104 records a photographed image on a magnetic disk or a memory card.

In the fourth embodiment, the measured values supplied from the sensors 90, 92 and 94 are recorded on a recording medium together with a subject image. However, a display device (for example, a liquid-crystal display device) for displaying the measured values supplied from the sensors 90, 92 and 94 may be separately disposed within the viewing field of a viewfinder so that each measured value can be viewed together with a subject image by means of the display device.

A translucent liquid-crystal device may be disposed in front of a monitor screen on which a subject image is displayed, and the measured values supplied from the sensors 90, 92 and 94 may be displayed by using the translucent liquid-crystal device. With this arrangement, it is possible to view the subject image and each measured value at the same time and it is also possible to record only the subject image on a recording medium.

As will be readily understood from the above description, according to the present embodiment, it is possible to confirm a water depth within a viewfinder. In addition, since a warning is generated at a water depth which exceeds a set allowable value, a user is prevented from submerging excessively deeply.

What is claimed is:

1. An image sensing apparatus comprising:
   (a) image sensing means for outputting an image signal representative of a subject image;
   (b) a direction sensor for measuring directions;
   (c) indication signal generating means for generating an indication signal indicating a direction measured by said direction sensor;
   (d) combining means for combining an output of said image sensing means and an output of said indication signal generating means;
   (e) image displaying means for displaying an image represented by an output of said combining means, said image displaying means being integrally formed with said image sensing means; and
   (f) recording means for recording the subject image on a recording medium.

2. An image sensing apparatus, comprising:
(a) image sensing means for outputting an image signal representing a subject image;
(b) a direction sensor for measuring directions;
(c) display means for displaying the image sensed by said image sensing means and a direction measured by said direction sensor, said display means being integrally formed with said image sensing means; and
(d) recording means for recording the subject image on a recording medium.

3. An image sensing apparatus comprising:
primary image sensing means for imaging a subject;
subsidiary image sensing means for imaging a pressure indication of a compressed-air cylinder;
combining/selecting means for combining an output of said primary image sensing means and an output of said subsidiary image sensing means or selecting either output; and
monitor means for displaying an image represented by an output of said combining/selecting means.

4. An image sensing apparatus according to claim 3, wherein said primary image sensing means includes a charge-coupled device and signal processing means for subjecting an output of said charge-coupled device to predetermined signal processing.

5. An image sensing apparatus according to claim 3, wherein said monitor means includes an electronic viewfinder.

6. An image sensing apparatus comprising:
(a) image sensing means for imaging a subject;
(b) remaining-pressure detecting means for detecting a pressure indication of a compressed-air cylinder; and
(c) display means for displaying an output of said image sensing means and/or an detection output of said remaining-pressure detecting means, said display means being integrally formed with said image sensing means.

7. An image sensing apparatus according to claim 6, wherein said image sensing means includes a charge-coupled device and signal processing means for subjecting an output of said charge-coupled device to predetermined signal processing.

8. An image sensing apparatus according to claim 6, wherein said display means includes an electronic viewfinder.

9. An image sensing apparatus comprising:
(a) image sensing means for sensing an object;
(b) first detecting means for detecting a remaining amount in a compressed-air cylinder;
(c) second detecting means for detecting the remaining amount of a recording medium;
(d) third detecting means for detecting the remaining amount of a battery;
(e) display means for displaying an output of said image sensing means and/or a detection output of each detecting means, said display means being integrally formed with said image sensing means; and
(f) warning means for giving a warning when an output of any of said first to third detecting means reaches a predetermined value.

10. An image sensing apparatus according to claim 9, wherein said warning means includes means for displaying a predetermined warning in a viewfinder.

11. An image sensing apparatus according to claim 9, wherein all of said means are accommodated in a single waterproof case.

12. An image sensing apparatus, comprising:
(a) image sensing means for outputting an image signal of an object;
(b) detecting means for detecting a condition of an area surrounding said image sensing means and outputting an information signal relative to the condition;
(c) display means for displaying an output of said image sensing means; and
(d) combining means for combinedly displaying a detection output from said detecting means with a display of said display means,
said display means being integrally formed with said image sensing means and said combining means.

* * * * *